United States Patent
Du et al.

(10) Patent No.: US 10,611,327 B2
(45) Date of Patent: Apr. 7, 2020

(54) OUTER BODY PART ASSEMBLY OF A VEHICLE

(71) Applicants: Compagnie Plastic Omnium, Lyons (FR); Yanfeng Plastic Omnium Automotive Exterior Systems Co., Ltd., Shanghai (CN)

(72) Inventors: Hailong Du, Shanghai (CN); Zhongyu Ma, Shanghai (CN)

(73) Assignees: Compagnie Plastic Omnium (FR); Yanfeng Plastic Omnium Automotive Exterior Systems (CN)

( * ) Notice: Subject to any disclaimer, the term of this patent is extended or adjusted under 35 U.S.C. 154(b) by 95 days.

(21) Appl. No.: 15/757,545

(22) PCT Filed: Sep. 5, 2016

(86) PCT No.: PCT/CN2016/098014
§ 371 (c)(1),
(2) Date: Mar. 5, 2018

(87) PCT Pub. No.: WO2017/045543
PCT Pub. Date: Mar. 23, 2017

(65) Prior Publication Data
US 2018/0257594 A1  Sep. 13, 2018

(30) Foreign Application Priority Data

Sep. 17, 2015 (CN) .................. 2015 2 0723112 U

(51) Int. Cl.
*B60R 19/50* (2006.01)
*B60R 19/02* (2006.01)
(Continued)

(52) U.S. Cl.
CPC ................ *B60R 19/50* (2013.01); *B60Q 1/20* (2013.01); *B60R 13/04* (2013.01); *B60R 19/02* (2013.01);
(Continued)

(58) Field of Classification Search
CPC . B60J 5/04; B60J 5/0455; B60J 5/0481; B60J 5/10; B60R 19/02; B60R 19/18; B60R 19/50; B62D 25/10; B62D 25/12
(Continued)

(56) References Cited

U.S. PATENT DOCUMENTS 6,237,990 B1 * 5/2001 Barbier ................ B62D 25/082
  296/187.09
7,681,700 B2 * 3/2010 Ginja ...................... B60R 19/18
  188/377
(Continued)

FOREIGN PATENT DOCUMENTS

CN    101096194 A    1/2008
CN    102476617 A    5/2012
(Continued)

*Primary Examiner* — Jason S Daniels
(74) *Attorney, Agent, or Firm* — St. Onge Steward Johnston & Reens, LLC

(57) ABSTRACT

An outer body part assembly for a vehicle, including an outer skin and a support member fixed to the outer skin. The outer skin is attached on a structural module of the vehicle via the support member, the support member includes a main body and a flange edge arranged around the main body and connected with the outer skin, the main body is in the form of mesh structure and includes a contact portion for supporting the outer skin and a reinforcement rib projecting from the contact portion for reinforcing the contact portion. The assembly prevents the outer skin from sinking, benefiting from the lightweight of the main body of the mesh structure, and the main body meets the supporting strength requirements by enhancing the strength of the mesh struc-
(Continued)

ture with the reinforcement ribs. In addition, the mesh structure also provides an effective energy absorption in case of a crash.

10 Claims, 5 Drawing Sheets

(51) Int. Cl.
*B60R 13/04* (2006.01)
*B60Q 1/20* (2006.01)
*B60R 19/18* (2006.01)
*B60J 5/04* (2006.01)
*B62D 25/06* (2006.01)
*B62D 25/12* (2006.01)

(52) U.S. Cl.
CPC ........... *B60R 19/023* (2013.01); *B60J 5/0415* (2013.01); *B60J 5/0455* (2013.01); *B60R 2019/1886* (2013.01); *B60R 2019/505* (2013.01); *B62D 25/06* (2013.01); *B62D 25/12* (2013.01)

(58) Field of Classification Search
USPC .................... 293/117; 296/146.5, 181.2, 198
See application file for complete search history.

(56) References Cited

U.S. PATENT DOCUMENTS

| | | | |
|---|---|---|---|
| 8,267,446 B2* | 9/2012 | Gonin | B60R 19/12 293/120 |
| 9,604,586 B2* | 3/2017 | Nickel | B60R 19/18 |
| 2003/0155788 A1* | 8/2003 | Cordebar | B62D 29/048 296/29 |
| 2007/0182212 A1* | 8/2007 | Roux | B60R 21/34 296/198 |
| 2014/0110964 A1* | 4/2014 | Schijve | B60J 5/0422 296/146.6 |
| 2015/0291228 A1* | 10/2015 | Huber | B62D 25/02 296/24.43 |

FOREIGN PATENT DOCUMENTS

| | | |
|---|---|---|
| CN | 103373303 A | 10/2013 |
| CN | 204915569 U | 12/2015 |
| DE | 102009002777 A1 | 11/2010 |
| JP | H0384284 U | 8/1991 |
| JP | 2007245920 A | 9/2007 |
| WO | 2012102789 A1 | 8/2012 |

* cited by examiner

OUTER BODY PART ASSEMBLY OF A VEHICLE

TECHNICAL FIELD

The present invention relates to an automobile part, and more particularly to an outer body part assembly of a vehicle.

BACKGROUND ART

Automobiles, as the most common transportation tool, are widely used in daily lives.

Along with the rapid development of scientific technologies, consumers have set higher requirements on appearance and safety performance of automobiles. Moreover, an outer body part assembly of a vehicle plays an important role in the appearance of an automobile. To satisfy the increasingly higher requirements of consumers on appearance of automobiles, vehicle producers make great efforts to improve the outer body part assembly in an attempt to produce a new product having a novel look and integrated with multiple functions.

In the prior art, an outer body part assembly generally comprises an outer skin and a support member arranged behind the outer skin and supporting the outer skin, wherein the outer skin overlaps on a structural module of the vehicle via the support member. In order to integrate multiple functions on the outer body part assembly, we need to install a variety of peripheral components on the support member, such as fog lights, wheel cover, radar, lights washer, etc., which in turn increases its own weight for the support member and further leads to a sink of the outer skin, thus the problem of mismatch with the peripheral parts occurs.

SUMMARY OF THE INVENTION

To solve the prior-art problem of mismatch with the peripheral parts as a result of a sink of the outer skin, the present invention is intended to provide a new type of outer body part assembly.

The invention provides an outer body part assembly for a vehicle, comprising an outer skin and a support member fixed to the outer skin, characterized in that the outer skin is attached on a structural module of the vehicle via the support member, the support member comprises a main body and a flange edge arranged around the main body and connected with the outer skin, the main body is in the form of mesh structure and comprises a contact portion for supporting the outer skin and a reinforcement rib for reinforcing the contact portion, the reinforcement rib projecting from the contact portion.

Advantageously, the contact portion and the reinforcement rib are arranged perpendicular to each other.

According to the invention, the outer body part of the vehicle belongs to the group consisting of a front bumper, a rear bumper, a tailgate, a door, a hood, and a roof.

In a preferred embodiment according to the invention, the flange edge is provided with at least one snap, and the outer skin is provided with at least one snap slot. The support member and the outer skin can be connected to each other by inserting the snap into the snap slot.

In a preferred embodiment according to the invention, the flange edge is provided with at least one flange, and the outer skin is provided with at least one flange slot.

The support member and the outer skin can be connected to each other by inserting the flange into the flange slot.

In a preferred embodiment according to the invention, the assembly further comprises a fog light, the flange edge is provided with a mounting member, the fog light being fixed onto the support member through the mounting member.

Advantageously, the mounting member is provided with a threaded hole, and the fog light is fixed onto the support member through a fog light screw inserted into the threaded hole.

Advantageously, the flange edge is provided with an adjusting member comprising a limiting rib, and the fog light is mounted with a 1-5 mm gap from the limiting rib.

In a preferred embodiment according to the invention, the assembly further comprises an accessory part, and the flange edge is provided with a connecting member, the accessory part being fixed onto the support member through the connecting member.

Advantageously, the connecting member is provided with a mounting hole, and the accessory part is fixed onto the support member through a fastener inserted into the mounting hole.

According to the invention, the accessory part belongs to the group consisting of a wheel cover, a radar, and a light washer.

The assembly according to the invention prevents the outer skin from sinking benefiting from the lightweight of the main body of the mesh structure, and the main body meets the supporting strength requirements by enhancing the strength of the mesh structure with the reinforcement ribs. In addition, the mesh structure also provides an effective energy absorption in case of a car crash. The support member according to the present invention is fixedly connected to the outer skin by simple snap fits of snaps and flanges. The peripheral parts, such as a fog light, a wheel cover, a radar, or a light washer, are fixedly mounted through the mounting member and the connecting member, thereby providing a light-weighted assembly with integrated functions of skin supporting and parts installation. Moreover, the support member according to the present invention can be locally adjusted through the adjusting member, so as to hook the fog lights and prevent the fog lights from being depressed inward.

DETAILED DESCRIPTION OF THE PREFERRED EMBODIMENTS

The preferred embodiments of the present invention will be provided and described in details with reference to the drawings. Hereinafter, the embodiments to be described are based on a bumper assembly of a vehicle. It could be understood that other examples for any other outer body part assembly for a vehicle also fall into the protection scope of the invention.

Figure 1:
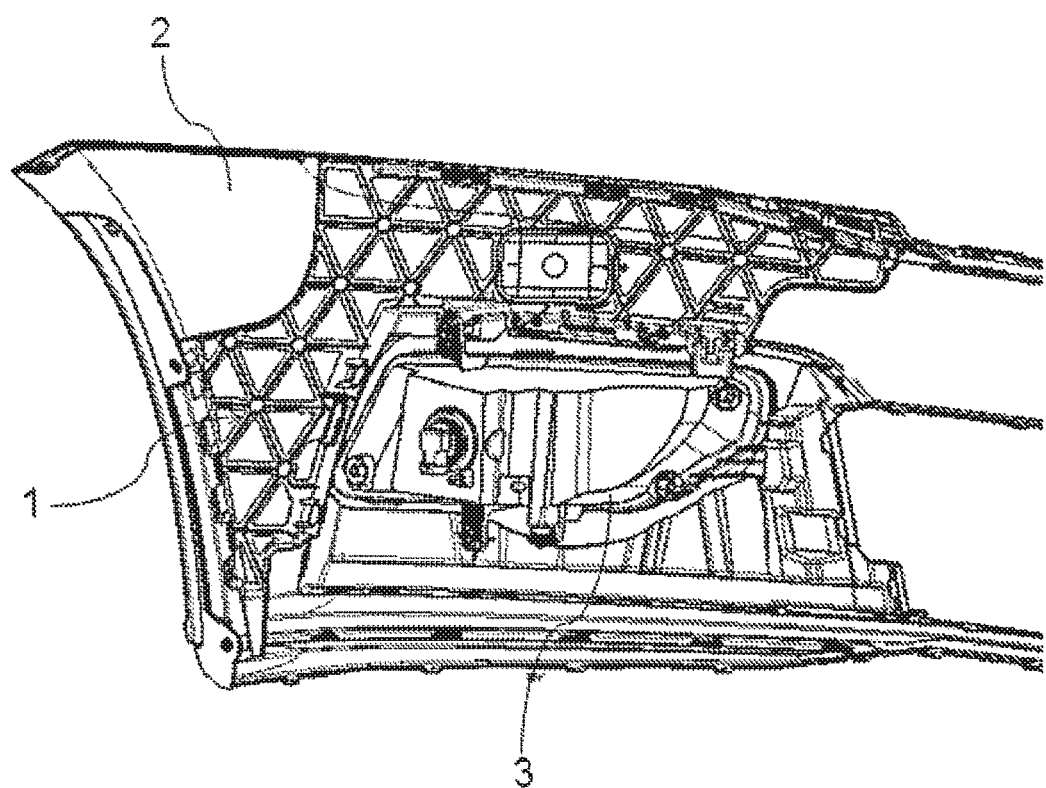
FIG. 1 illustrates a perspective view of an outer body part assembly of a vehicle according to a preferred embodiment of the present invention.

FIG. 1 illustrates a perspective view of the bumper assembly according to a preferred embodiment of the present invention, the bumper assembly comprising a support member 1, an outer skin 2 and fog lights 3. The support member 1 is fixed to the outer skin 2, the outer skin 2 is overlapped on a front-end module (not shown) of the vehicle via the support member 1, and the fog light 3 is fixedly mounted to the support member 1 at a corresponding position.

Figure 2:
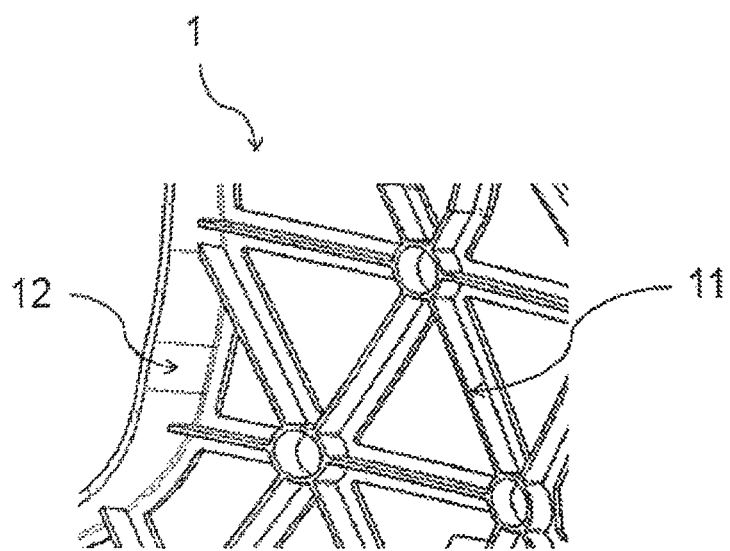
FIG. 2 illustrates an enlarged partial view of the support member in FIG. 1.

FIG. 2 illustrates an enlarged partial view of the support member 1 in FIG. 1. The support member 1 has a main body 11 and a flange edge 12 arranged around the main body 11. The contour of the flange edge 12 is the same as the prior-art flange edge of support member, which will not be reiterated herein. Different from the prior art, the main body 11 is in the form of triangle mesh structure, such that the hollowed-out main body 11 helps to reduce the total weight of the support member 1, which solves the problem of a sink of the outer skin and ensures a precise match between the support member and the peripheral parts.

Figure 3:
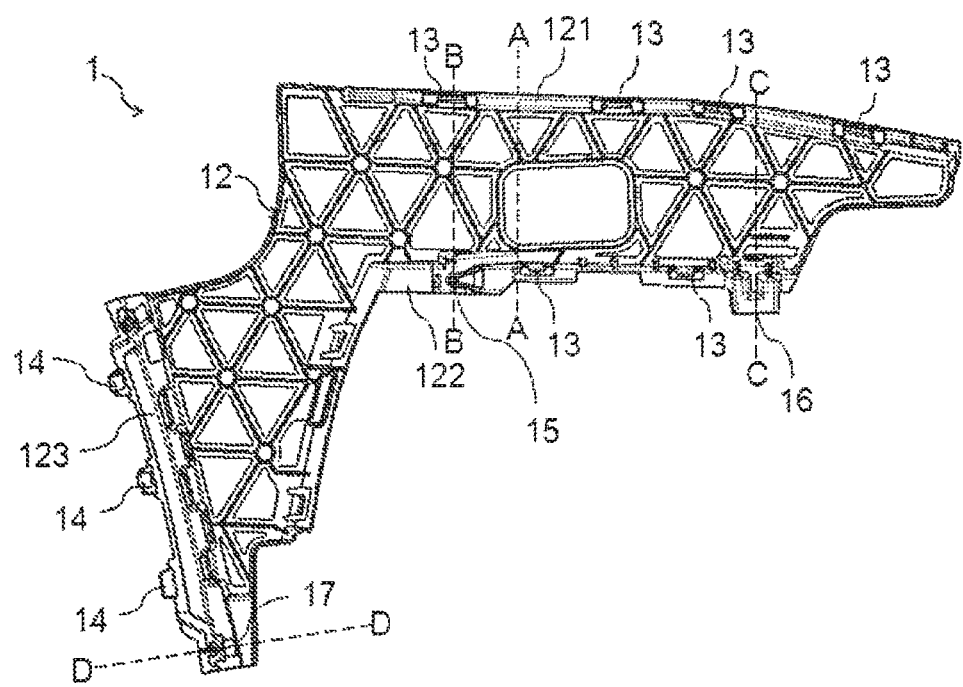
FIG. 3 illustrates a rear view of the support member in FIG. 1.

FIG. 3 illustrates the rear view of the support member 1 in FIG. 1. The flange edge 12 of the support member 1 comprises an upper flange edge 121, a lower flange edge 122 and a lateral flange edge 123, wherein the upper flange edge 121 is used for supporting and connecting the outer skin 2 (see FIG. 1), the lower flange edge 122 is used for connecting the outer skin 2 and the fog light 3 (see FIG. 1), and the lateral flange edge 123 is used for the outer skin 2 (see FIG. 1).

In regard to the connection between the support member 1 and the outer skin 2, the upper flange edge 121 has four snaps 13, and correspondingly the outer skin 2 has four snap slots, such that by inserting the snap 13 into the snap slot can the support member 1 and the outer skin 2 be fixedly connected. Similarly, the lower flange edge 122 has two snaps 13, and correspondingly the outer skin 2 has two snap slots, such that by inserting the snap 13 into the snap slot can the support member 1 and the outer skin 2 be fixedly connected. In addition, the lateral flange edge 123 has three flanges 14, and correspondingly the outer skin 2 has three flange slots, such that by inserting the flange 14 into the flange slot can the support member 1 and the outer skin 2 be fixedly connected.

Figure 4:
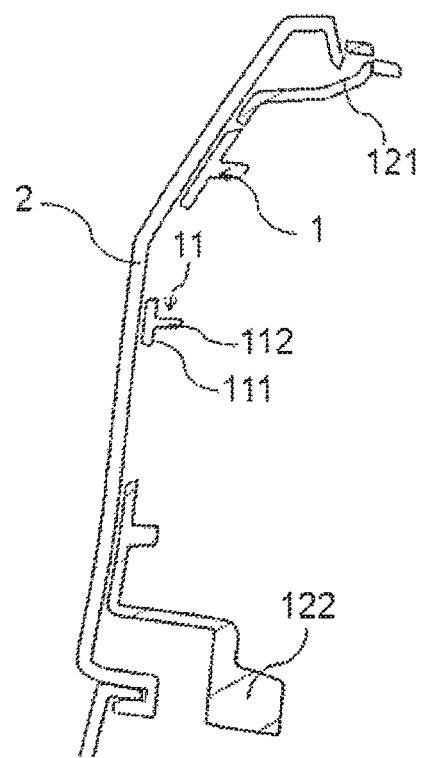
FIG. 4 illustrates a sectional view of the support member and the outer skin assembled together, taken along the line A-A of FIG. 3.

To clearly show the support of the support member 1 to the outer skin 2, FIG. 4 illustrates the sectional view of the support member 1 and outer skin 2 assembled together, taken along the line A-A of FIG. 3. The cross-sectional view of the main body 11 of the support member 1 is shown in a T shape with a contact portion 111 and a reinforcement rib 112 perpendicularly arranged to each other, and the contact portion 111 contacts the inner surface of the outer skin 2 to form a substantially transverse support and the reinforcement rib 112 reinforces the strength of the contact portion 111. The upper flange edge 121 of the support member 1 is arranged at the bottom of the outer skin 2 to form a substantially vertical support to the outer skin 2.

Figure 5:
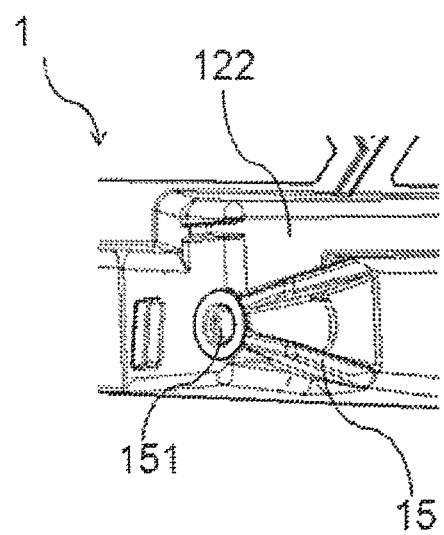
FIG. 5 illustrates an enlarged partial view of the mounting member in FIG. 3.
Figure 6:
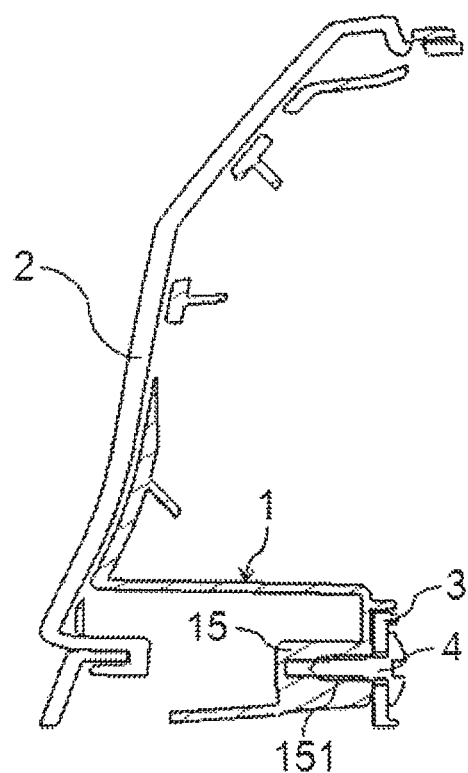
FIG. 6 illustrates a sectional view of the mounting member of the support member and the fog light assembled together, taken along the line B-B of FIG. 3.
Figure 7:
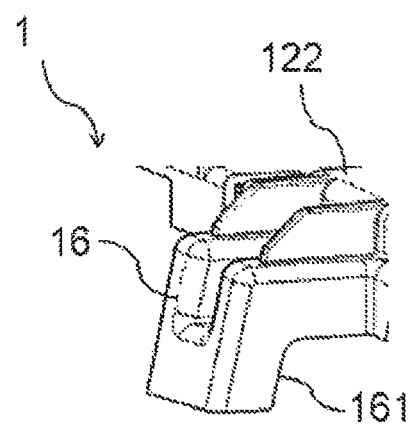
FIG. 7 illustrates an enlarged partial view of the adjusting member in FIG. 3.
Figure 8:
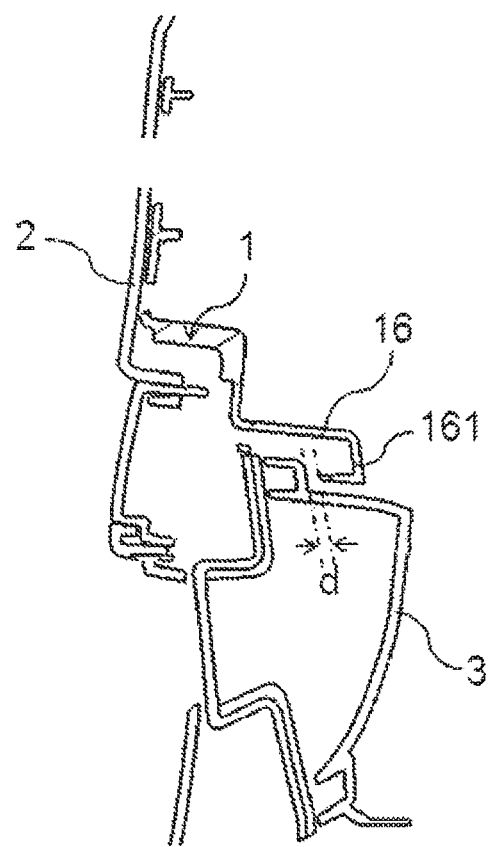
FIG. 8 illustrates a sectional view of the adjusting member of the support member and the fog light assembled together, taken along the line C-C of FIG. 3.

For installation of the support member 1 and the fog light 3, the lower flange edge 122 has a mounting member 15 and an adjusting member 16. FIG. 5 illustrates the enlarged partial view of the mounting member 15 with a threaded hole 151. FIG. 6 illustrates the sectional view of the mounting member 15 of the support member 1 and the fog light 3 assembled together, taken along the line B-B of FIG. 3, wherein the fog light 3 is fixed to the support member 1 through a screw 4 thereof. FIG. 7 illustrates an enlarged partial view of the adjusting member 16 with a limiting rib 161. FIG. 8 illustrates the sectional view of the adjusting member 16 of the support member 1 and the fog light 3 assembled together, taken along the line C-C of FIG. 3, wherein it must ensure that there is a gap d of about 3 mm between the fog light 3 and the limiting rib 161 under the normal assembling state. When the fog light 3 is depressed inward due to an external force (a substantially rightward force as shown in the drawing), the fog light 3 is hooked as being limited by the position of the limiting rib 161 and thereby can be prevented from being depressed inward.

Figure 9:
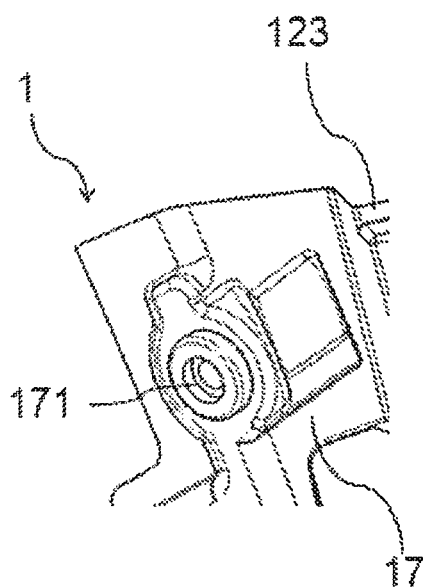
FIG. 9 illustrates an enlarged partial view of the connecting member in FIG. 3.
Figure 10:
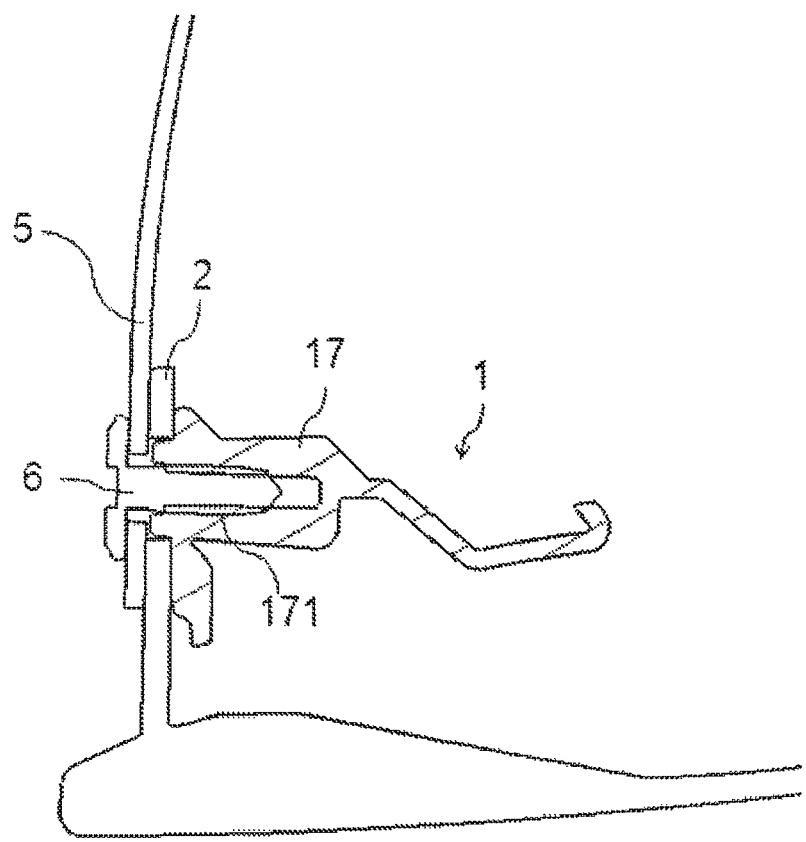
FIG. 10 illustrates a sectional view of the connecting member of the support member and the wheel cover assembled together, taken along the line D-D of FIG. 3.

For installation of the support member 1 and other peripheral parts, such as wheel covers, radar and headlight washers, the lateral flange edge 123 may have a connecting member 17. Although FIG. 3 only shows one connecting member 17, the position and number of the connecting members can be adjusted as needed according to actual conditions. FIG. 9 illustrates an enlarged partial view of the connecting member 17 having a mounting aperture 171. FIG. 10 illustrates the sectional view of the connecting member 17 of the support member 1 and the wheel cover 5 assembled together, taken along the line D-D of FIG. 3.

The above is only the preferred embodiments of the present invention and is not intended to limit the scope of the present invention. Variations can be also be made to the embodiments of the present invention, that is, any simple and equivalent variations and modifications made according to the claims and description of the present application for invention fall into the protection scope defined in the claims of the present invention. Those that are not described in detail herein are customary technical content.

The invention claimed is:
1. An outer body part assembly for a vehicle, comprising an outer skin and a support member fixed to the outer skin, the outer skin is attached on a structural module of the vehicle via the support member, the support member comprises a main body and a flange edge arranged around the main body and connected with the outer skin, the main body is in the form of a mesh structure and comprises a contact portion for supporting the outer skin and a reinforcement rib for reinforcing the contact portion, the reinforcement rib projecting from the contact portion;
wherein the assembly further comprises a foci light, and the flange edge is provided with a mounting member, the fog light being fixed onto the support member through the mounting member; and
wherein the flange edge is provided with an adjusting member comprising a limiting rib, and the foci light is mounted with a 1-5 mm gap from the limiting rib.
2. The assembly according to claim 1, wherein the contact portion and the reinforcement rib are arranged perpendicular to each other.

3. The assembly according to claim 1, wherein the outer body part of the vehicle belongs to the group consisting of a front bumper, a rear bumper, a tailgate, a door, a hood, and a roof.

4. The assembly according to claim 1, wherein the flange edge is provided with at least one snap, and the outer skin is provided with at least one snap slot, the support member and the outer skin being connected to each other by inserting the snap into the snap slot.

5. The assembly according to claim 1, wherein the flange edge is provided with at least one flange, and the outer skin is provided with at least one flange slot, the support member and the outer skin being connected to each other by inserting the flange into the flange slot.

6. The assembly according to claim 1, wherein the mounting member is provided with a threaded hole, and the fog light is fixed onto the support member through a fog light screw inserted into the threaded hole.

7. The assembly according to claim 1, wherein the assembly further comprises an accessory part, and the flange edge is provided with a connecting member, the accessory part being fixed onto the support member through the connecting member.

8. The assembly according to claim 7, wherein the connecting member is provided with a mounting hole, and the accessory part is fixed onto the support member through a fastener inserted into the mounting hole.

9. The assembly according to claim 7, wherein the accessory part belongs to the group consisting of a wheel cover, a radar, and a light washer.

10. The assembly according to claim 8, wherein the accessory part belongs to the group consisting of a wheel cover, a radar, and a light washer.

* * * * *

UNITED STATES PATENT AND TRADEMARK OFFICE
CERTIFICATE OF CORRECTION

PATENT NO. : 10,611,327 B2
APPLICATION NO. : 15/757545
DATED : April 7, 2020
INVENTOR(S) : Hailong Du et al.

It is certified that error appears in the above-identified patent and that said Letters Patent is hereby corrected as shown below:

On the Title Page

Item (71) Line 1:
"Compagnie Plastic Omnium, Lyons"
Should be changed to:
-- Compagnie Plastic Omnium, Lyon --

Signed and Sealed this
Twenty-sixth Day of May, 2020

Andrei Iancu
*Director of the United States Patent and Trademark Office*